3,190,688
METHOD AND MEANS FOR MOUNTING A CAB ON A TRACTOR
Marvin L. Westrum and Dalton M. Westrum, Stratford, Iowa, assignors to WGW Engineering, Inc., Stratford, Iowa, a corporation of Iowa
Filed Jan. 17, 1964, Ser. No. 338,477
3 Claims. (Cl. 296—102)

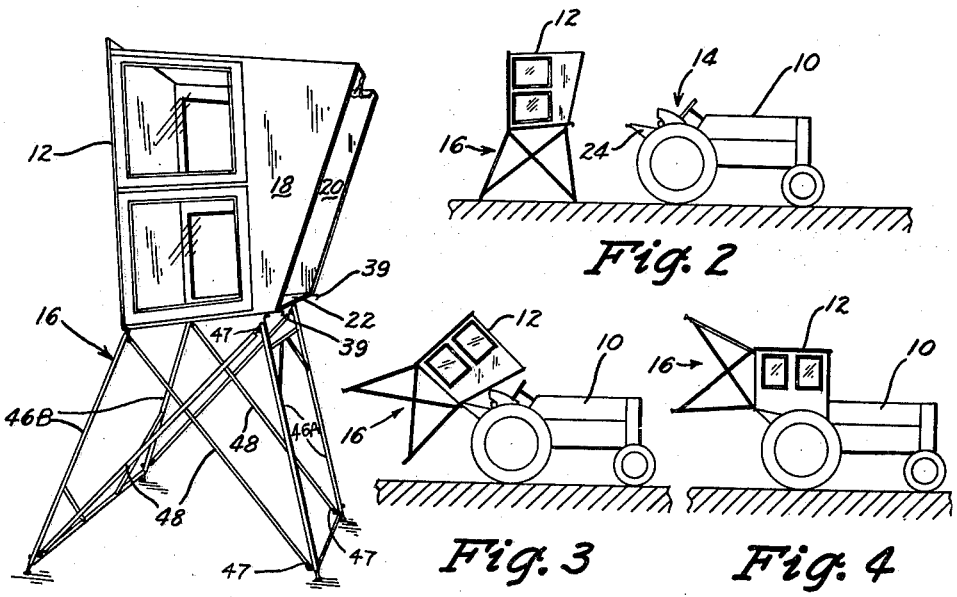
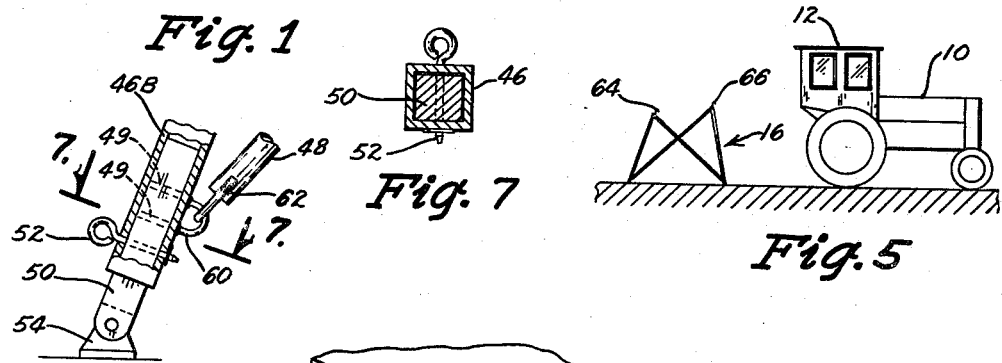
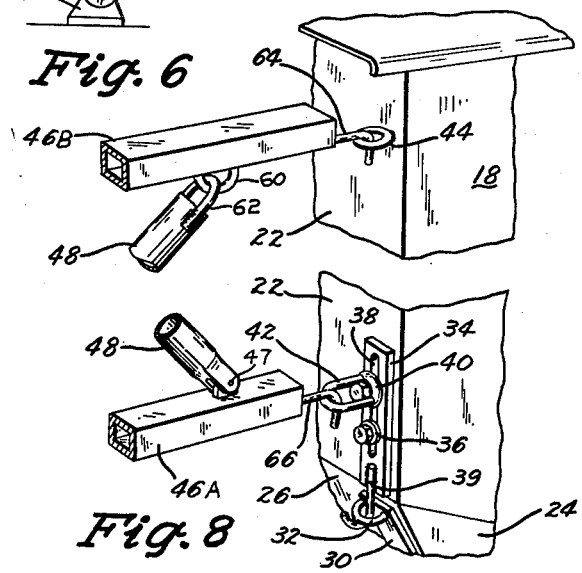

This application is a continuation-in-part of applicants' co-pending application on a detachable tractor cab, Serial No. 267,489 filed March 25, 1963. The present invention relates to a support stand for a tractor cab and its use in mounting the cab on the tractor and removing it therefrom.

Accordingly, one of the objects of this invention is to provide a cab support stand which will support the cab in a position whereby one person may easily mount the cab on a tractor.

Another object of this invention is to provide a cab support stand which is readily adjustable to provide the desired height.

A further object of this invention is to provide a cab support stand which serves as a lever in pivoting the cab into its normal upright position on a tractor.

It is still a further object of this invention to provide a cab support stand which may be readily removed from the cab after the cab has been secured to the tractor in its normal upright position.

A still further object of this invention is to provide a lightweight but yet structurally strong cab support stand which may be easily moved by one person.

A further object of this invention is to provide a cab support stand which is simple in design, economical to manufacture and refined in appearance.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is an elevational perspective view of the tractor cab disposed on the cab support stand;

FIG. 2 is a side elevation view of the cab on the cab supporting stand just prior to being placed on a tractor;

FIG. 3 is a side elevational view of the cab and cab supporting stand being pivoted onto the tractor;

FIG. 4 is a side elevational view showing the cab completely mounted on the tractor and the cab supporting stand extending rearwardly thereof;

FIG. 5 is a side elevational view of the tractor with the cab mounted thereon and the cab supporting stand removed from the cab;

FIG. 6 is a fragmentary cross-sectional elevational view of one of the legs of the cab supporting stand showing in particular the manner in which it may be adjusted to provide the desired length;

FIG. 7 is a cross-sectional view of the leg of the cab supporting stand of FIG. 6 taken along line 7—7 in FIG. 6; and FIG. 8 is a fragmentary enlarged elevational view of the upper and lower connections between the cab supporting stand and the cab when mounted on the tractor.

Referring now to the drawings it is seen that the present invention includes a conventional tractor 10 which is adapted to receive a cab 12 over the driving station 14 on the tractor. However, when the cab 12 is removed from the tractor, it is supported on the cab stand 16 which will hereinafter be described in greater detail and is also used to assist in placing the cab in its normal upright position on the tractor. As best seen in FIGS. 1 and 8, the cab 12 has a pair of side panels 18 and 20 and a rear panel 22.

Obtuse triangular panels 24 (only one of which is shown) are secured to the outside lateral edges of auxiliary platforms (not shown) mounted on the tractor in the driving station area. The apex of these panels 24 is positioned upwardly and rearwardly of the platform components. A rear panel 26 connects the rearward edges of panels 24. The lower edges of the cab panels 18, 20 and 22 are shaped to matingly contact the upper edges of the panels 24 and 26. The line of contact between the rear panel 22 of the cab 12 and the panel 26 serves as an axis of pivotal rotation for mounting and removing the cab 12.

The lower panel 26 is provided with a bar 30 at each of its lateral side edges. A U-shaped eyelet 32 extends rearwardly from each of the bars 30 at the upper ends thereof.

Bars 34 which are similar to the bars 30 are adjustably secured to the lower rear edges of the rear panel 22 by a bolt 36 which is permitted to move in a slot 38 to adjust the bar 34 to the desired vertical position. A J-shaped hook 39 is welded to and extends downwardly from the lower end of the bar 34 and is adapted to be detachably received in the eyelet 32 at times.

A second bolt 40 similar to bolt 36 assists in securing the bar 34 to the panel 22 and additionally is provided with a rearwardly extending fastener eyelet 42. Directly above the bar 34 and in particular the eyelet 42 is another eyelet 44 which is fixedly secured to the upper end of the rear panel 22.

The cab supporting stand 16 is provided with extendable legs 46 at each of its four corners. These legs are secured together by braces 48 along the sides of the stand in a manner giving the stand 16 a base having a greater area than the top cab supporting surface. As seen in FIGS. 1 and 8, the ends of the braces 48 are secured to the forward legs 46A by removable pins 47 which permit the stand 16 to be disassembled into two units, as viewed in FIG. 1, the rear posts 46B with the braces 48 and the front frame unit of two posts 46A and interconnecting braces. By this arrangement the stand 16 may be easily assembled for use and disassembled for storage or moving.

Each of the legs 46A and B, as shown in FIGS. 6 and 7, are hollow and rectangular in cross-section and provided with a plurality of spaced apart holes 49. A leg member 50 is adapted to be telescopically received within the hollow leg 46 and held in the desired position by a pin 52 which is extended through the leg member 50 and one of the openings 49 in the leg 46. At the lower free end of the leg member 50 a pivotal foot 54 is provided. As shown in FIGS. 6 and 8, the legs 46B are secured to the brace 48 by interconnected eyelets 60 and 62.

As best shown in FIGS. 1, 5 and 8, the hook-like fastener members 64 and 66 at the rear and forward sides of the cab supporting stand 16 are provided on the legs 46A and B for detachable engagement in the eyelets 44 and 42 respectively, on the rear panel 22 of the cab 12.

Thus, in operation, the cab 12 is placed on top of the cab supporting stand 16 with the hooks 64 and 66 in engagement with the eyelets 44 and 42 respectively on the rear panel 22 of the cab 12. Once the cab 12 is placed upon the cab supporting stand 16, it should never need to be removed to the ground. Next the tractor 10 is backed into a position whereby the eyelets 32 on the rear panel 26 are in approximate vertical alignment. Then, if necessary, the cab 12 is lowered or raised by adjusting the length of the legs 46 as shown in FIGS. 6 and 7. After this adjustment the hooks 39 should be in a position to be received by the eyelets 32. Next, the operator may lift the cab supporting stand 16 along the rear side and thus cause the cab 12 to pivot upwardly and over the driving station 14 on the tractor 10 as shown in the sequence of illustrations in FIGS. 1 through 4. After the cab 12 is locked in its vertical upright position, as shown in FIG. 4, the cab supporting stand 16 may be removed by simply lifting it upwardly and disengaging the hooks 64 and 66 from the eyelets 44 and 42 respectively. The cab supporting stand 16 is then returned to the ground and it is ready for receiving the cab 12 at a later time.

In removing the cab 12 from the tractor 10 the reverse procedure is followed wherein first the cab supporting stand is secured to the rear of the cab as shown in FIG. 4. Next, the operator taking advantage of the leverage provided by the cab supporting stand 16, grips the outer ends of the legs 46B and pivots the cab stand 16 and cab 12 rearwardly and downwardly to the position of FIG. 3. And finally the stand and cab will readily pivot to a vertical upright position as shown in FIG. 2 and the tractor 10 may be driven away.

Some changes may be made in the construction and arrangement of our method and means for mounting a cab on a tractor without departing from the real spirit and purpose of our invention, and it is our intention to cover by our claims, any modified forms of structure or use of mechanical equivalents which may be reasonably included within their scope.

We claim:

1. In combination,
    a tractor having a driving station at its rearward end,
    a cab structure adapted to be normally disposed over said driving station and having means for pivotally and detachably securing it along its rearward lower edge to the rearward end of said tractor,
    a cab supporting stand normally disposed in an upright position on the ground, said stand having a plurality of legs, each of said legs having a pair of adjustable members adjustable longitudinally of each other to adapt the stand for being adjusted to the desired height relative to said tractor,
    releasable connecting means on the top of said stand, anchor means on the rear side of said cab,
    said cab adapted to be placed on said stand with the releasable connecting means on the top of said stand in engagement with the anchor means on the rear of said cab, said cab and said supporting stand forming a rigid elongated unit, said first mentioned means on said cab adapted to be pivotally and detachably secured to the rear end of said tractor and by lifting upwardly on the lower ground engaging end of said stand said cab may be pivoted to its normal upright position over the driving station on said tractor, and
    said cab supporting stand comprises a pair of frame units each of which includes at least one of said legs, and brace members for interconnecting said frame units, said stand has means for detachably connecting one of said frame units and said brace members to the outer of said frame units, and said frame units being spaced apart along a line extending rearwardly of said tractor when said stand is positioned behind said tractor.

2. In combination,
    a tractor having a driving station at its rearward end,
    a cab structure adapted to be normally disposed over said driving station and having means for pivotally and detachably securing it along its rearward lower edge to the rearward end of said tractor,
    a cab supporting stand normally disposed in an upright position on the ground, said stand having a plurality of legs, each of said legs having a pair of adjustable members adjustable longitudinally of each other to adapt the stand for being adjusted to the desired height relative to said tractor, said stand having forward and rearward sides relative to said tractor, said forward side being adjacent said tractor when said stand is in its normally disposed upright position and behind said tractor,
    releasable connecting means on the top of said stand, said connecting means including spaced apart fasteners adjacent said forward and rearward sides of said stand,
    anchor means on the rear side of said cab, said anchor means including fasteners adjacent the top and bottom sides of said cab, said fasteners on said cab being spaced apart for engagement with said fasteners on said stand,
    said cab adapted to be placed on said stand with the releasable connecting means on the top of said stand in engagement with the anchor means on the rear of said cab with said fasteners adjacent the rear of said stand and the top of said cab in engagement and the fasteners adjacent the front of said stand and the bottom of said cab in engagement, said cab and said supporting stand forming a rigid elongated unit, said first mentioned means on said cab adapted to be pivotally and detachably secured to the rear end of said tractor and by lifting upwardly on the lower ground engaging end of said stand said cab may be pivoted to its normal upright position over the driving station on said tractor.

3. The structure of claim 2 wherein said cab supporting stand comprises a pair of frame units, each of which includes at least one of said legs, and brace members for interconnecting said frame units, and said frame units being spaced apart along a line extending rearwardly of said tractor when said stand is positioned behind said tractor.

References Cited by the Examiner

UNITED STATES PATENTS

| | | | |
|---|---|---|---|
| 1,167,792 | 1/16 | Bryon | 296—35.1 X |
| 1,283,326 | 10/18 | Schreck | 248—146 |
| 2,148,308 | 2/39 | Spear | 296—28.21 |
| 2,466,323 | 4/49 | Meyer | 248—146 |
| 2,565,919 | 8/51 | Hill | 296—102 X |

A. HARRY LEVY, *Primary Examiner.*